United States Patent
Angus

(10) Patent No.: US 7,198,304 B2
(45) Date of Patent: Apr. 3, 2007

(54) FLUID LINE CONNECTOR WITH INTERMEDIATE SMOOTH SURFACE

(75) Inventor: Michael T. Angus, Derry, PA (US)

(73) Assignee: Dormont Manufacturing Company, Export, PA (US)

( * ) Notice: Subject to any disclaimer, the term of this patent is extended or adjusted under 35 U.S.C. 154(b) by 36 days.

(21) Appl. No.: 10/854,419

(22) Filed: May 26, 2004

(65) Prior Publication Data

US 2004/0239109 A1    Dec. 2, 2004

Related U.S. Application Data

(60) Provisional application No. 60/474,176, filed on May 29, 2003.

(51) Int. Cl.
  *F16L 5/02*    (2006.01)
  *F16L 5/10*    (2006.01)

(52) U.S. Cl. ............... 285/903; 285/136.1; 285/141.1; 285/189; 285/215

(58) Field of Classification Search ............ 285/903, 285/136.1, 143.1, 226, 227, 139.1, 139.2, 285/139.3, 141.1, 206, 215, 216
See application file for complete search history.

(56) References Cited

U.S. PATENT DOCUMENTS

| | | | | |
|---|---|---|---|---|
| 1,849,206 A * | 3/1932 | Sater | ............................ | 285/18 |
| 3,401,958 A * | 9/1968 | Demyon | ..................... | 285/208 |
| 3,727,949 A * | 4/1973 | Kleykamp et al. | ............. | 285/7 |
| 4,232,712 A * | 11/1980 | Squires | ........................ | 138/109 |
| 4,494,779 A * | 1/1985 | Neff et al. | ................ | 185/154.1 |
| 4,613,169 A * | 9/1986 | Engelhart | ................ | 285/139.2 |
| 4,616,105 A * | 10/1986 | Borsh | ........................ | 174/65 R |
| 4,647,074 A | 3/1987 | Pate et al. | | |
| 4,663,036 A * | 5/1987 | Strobl et al. | ................... | 405/52 |
| 4,819,970 A * | 4/1989 | Umehara | ..................... | 285/227 |
| 4,864,080 A * | 9/1989 | Fochler et al. | ............. | 174/65 G |
| 5,062,457 A * | 11/1991 | Timmons | ..................... | 138/125 |
| 5,265,652 A * | 11/1993 | Brunella | ........................ | 141/59 |
| 5,361,577 A * | 11/1994 | Cromer | ........................ | 60/800 |
| 5,397,157 A * | 3/1995 | Hempel et al. | ............. | 285/227 |
| 5,538,294 A * | 7/1996 | Thomas | ........................ | 285/55 |
| 5,915,735 A * | 6/1999 | Noble | ............................. | 285/4 |
| 5,934,269 A * | 8/1999 | Wilson | ........................ | 126/512 |
| 6,007,110 A * | 12/1999 | Amatsutsu | ................... | 285/239 |
| 6,087,282 A * | 7/2000 | Panzera et al. | ................ | 501/21 |
| 6,102,445 A | 8/2000 | Thomas | | |
| 6,199,592 B1 * | 3/2001 | Siferd et al. | ................ | 138/109 |
| 6,338,507 B1 * | 1/2002 | Amatsutsu | ................... | 285/321 |
| 6,409,223 B1 * | 6/2002 | Bartholoma | ................ | 285/114 |
| 6,494,497 B1 * | 12/2002 | Kertesz | ...................... | 285/226 |
| 6,860,518 B2 * | 3/2005 | Krauss et al. | ............... | 285/206 |
| 2003/0034650 A1 * | 2/2003 | Krauss et al. | ............... | 285/206 |
| 2004/0007278 A1 * | 1/2004 | Williams | ..................... | 138/121 |

\* cited by examiner

*Primary Examiner*—James M. Hewitt
(74) *Attorney, Agent, or Firm*—Fay Sharpe LLP

(57) ABSTRACT

A fluid line connector includes a length of tubing having a plurality of corrugations formed therealong between opposing tubing ends. A non-corrugated section is disposed along the length of tubing between the opposing tubing ends such that a portion of the plurality of corrugations extends between the non-corrugated section and each of the opposing tubing ends.

20 Claims, 2 Drawing Sheets

FLUID LINE CONNECTOR WITH INTERMEDIATE SMOOTH SURFACE

This application claims priority from U.S. Provisional Patent Application No. 60/474,176 filed on May 29, 2003, which is hereby incorporated herein by reference in its entirety.

BACKGROUND

This invention relates to the art of fluid line connectors and, more particularly, to corrugated fluid line connectors having an intermediate section with a smooth exterior that is suitable for use in forming a fluid-tight connection between the fluid line and a wall or bulkhead through which the fluid line extends.

Fluid line connectors have been provided heretofore and are commonly known to extend and transport fluid through a wall or bulkhead, such as a firewall in the engine compartment of a vehicle or a firebox in a hearth application, for example. In many of such applications it is desirable to form a fluid-tight connection between the fluid line connector and the wall or bulkhead. This way, fluid on one side of the wall or bulkhead is not in fluid communication with the opposing side of the wall or bulkhead, except through the established fluid line connector.

As an example, in an appliance located inside a residence, such as a water heater, for example, it is desirable to prevent or minimize the flow of gaseous fuel, such as natural gas or propane, for example, through a cover that separates a burner chamber of the appliance from the ambient air in the residence around the appliance. To this end, it is desirable to form a fluid-tight connection between the cover and the exterior of the fluid line that extends therethrough to prevent the leakage of gaseous fuel out of the combustion chamber and into the surrounding ambient air of the residence. Such an arrangement is also beneficial in minimizing or preventing other combustion gases and byproducts from flowing out of the combustion chamber, and in minimizing or preventing vapors from undesirably entering the combustion chamber, such as vapors from paints or solvents that may be stored in an area adjacent the appliance.

Fluid line connectors are known to form fluid-tight passages through such walls, bulkheads or covers in various different ways. One way is to provide a hole through the bulkhead that has limited clearance for receiving a fitting. The fitting is secured to the bulkhead in any suitable fluid-tight manner, thus forming a fluid-tight passage through the wall. A fluid line segment is thereafter attached to each of the opposing ends of the fitting, also in a fluid-tight manner. In this way, fluid flows through one fluid line, into and through the fitting extending through the bulkhead, and out along the other attached fluid line.

Such arrangements have numerous disadvantages, however. One disadvantage is that a significant amount of time and effort can be required to install the fitting on or through the bulkhead, which often disadvantageously requires simultaneous activity along both sides of the same. Furthermore, once the fitting has been installed, additional time and effort is typically needed to attach the two fluid line segments to the opposing ends of the fitting. As such, significant cost can be associated with these types of arrangements. This is especially true where access to one or both sides of the bulkhead is limited. What's more, by the very nature of such arrangements, it is not possible to pre-assemble the same to take advantage of mass production efficiencies.

Also, another disadvantage is that the materials or construction of the wall or bulkhead can limit the type and style of connections that can be used to attach the fitting to the bulkhead and to connect the fluid line segments to the fitting. By way of example, if a polymeric material is used to form a portion of a bulkhead, the use of brazed connections may not be practical, as the heat needed to form the brazed joints could deform or otherwise damage the polymeric wall.

Another common way of forming a fluid passage through a wall or bulkhead is to extend a fluid line through a closely fitting hole in the wall or bulkhead and thereafter assemble or attach suitable end fittings to the fluid line, with each end fitting being on a different side of the wall or bulkhead and at least one end fitting having a greater cross-sectional dimension than that of the fluid line. Commonly, some sort of gasket, grommet or other sealing member will be installed between the bulkhead and the exterior of the fluid line to form a fluid-tight seal therebetween. Such arrangements, however, have disadvantages similar to those described above in that at least one of the end fittings need to be installed on the fluid line after it is passed through the opening in the bulkhead or wall. Once again, the end fittings are each on a different side of the bulkhead or wall, and the assembly of the end fittings onto the fluid line can be more difficult and time consuming where limited access or clearance is found on one or both sides of the bulkhead. As such, significant costs of assembly are often associated with these types of arrangements as well.

Still another way to provide a fluid line through a bulkhead or wall is to first install the end fittings on the fluid line and thereafter pass the same through an enlarged hole in the bulkhead that is of suitably size to allow the end fitting to fit through. One disadvantage of such arrangements is that a relatively small diameter fluid line can be left extending through a relatively large opening in the bulkhead. As such, a significant opening between the bulkhead and the exterior of the fluid line typically remains. Grommets and other suitable sealing arrangements can be installed between the bulkhead and the fluid line to form a seal therebetween. However, sealing between the bulkhead and the fluid line can be difficult where the fluid line is of a flexible, corrugated material, such as flexible metal fluid lines having annular or helical corrugations, for example. In these cases, the variable exterior of the fluid line makes the fluid-tight seating of a grommet, gasket or other sealing member difficult to achieve. As such, it is believed desirable to provide a fluid line connector having an intermediate smooth exterior surface to facilitate the formation of a seal between the fluid line connector and an associated bulkhead.

BRIEF DESCRIPTION

In accordance with the present invention, a fluid line connector is provided that avoids or minimizes the problems and difficulties encountered in connection with fluid line connectors of the foregoing nature, while promoting an increase in performance and reliability, and maintaining a desired simplicity of structure, economy of manufacture and ease of installation.

More particularly in this respect, a fluid line connector is provided and includes a length of tubing having a plurality of corrugations formed therealong between opposing tubing ends. The fluid line connector also includes a non-corrugated section disposed between the opposing tubing ends such that a portion of the plurality of corrugations extends between the non-corrugated section and each of the opposing tubing ends.

Additionally, a fluid line connector assembly is provided for installation on an associated wall having an associated passage extending therethrough. The fluid line connector assembly includes a length of tubing having a plurality of corrugations formed therealong between opposing tubing ends and a non-corrugated section disposed such that a portion of the plurality of corrugations extends between the non-corrugated section and each of the tubing ends. The fluid line connector assembly also includes a sealing member supported along the non-corrugated section. The length of tubing is positioned adjacent the associated wall such that the non-corrugated section is received along the associated passage. The sealing member extends between the non-corrugated section and the associated wall forming a substantially fluid-tight seal therebetween.

Furthermore, a fluid line connector assembly is provided and is adapted to be received on an associated wall having an associated passage extending therethrough. The associated passage has an associated passage axis and an associated minimum cross-sectional passage dimension extending substantially transverse the associated passage axis. The fluid line connector assembly includes a length of tubing having a plurality of corrugations formed therealong between opposing tubing ends and a non-corrugated section disposed such that a portion of the plurality of corrugations extends between the non-corrugated section and each of the tubing ends. The length of tubing has a longitudinal tubing axis, a maximum cross-sectional first tubing dimension extending substantially transverse the tubing axis across the plurality of corrugations, and a maximum cross-sectional second tubing dimension extending substantially transverse the tubing axis across the non-corrugated section. The first tubing dimension is greater than the second tubing dimension and is less than the associated passage dimension. The length of tubing is received on the associated wall such that the non-corrugated section is positioned along the associated passage. The fluid line connector assembly also includes a sealing member supported on the length of tubing and extending between the non-corrugated section and the associated wall to form a substantially fluid-tight seal therebetween.

DETAILED DESCRIPTION

Figure 1:
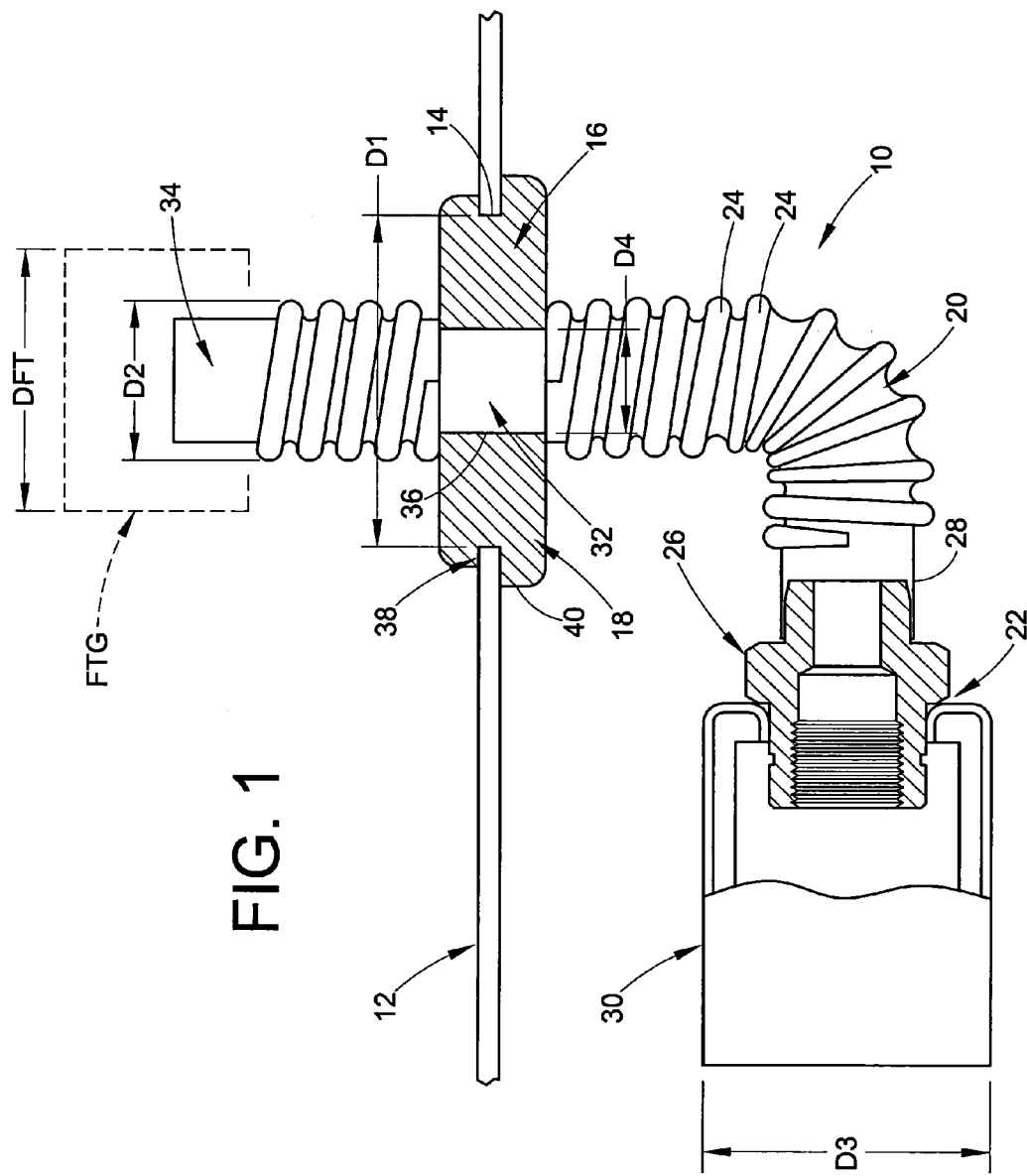
FIG. 1 is top plan view of one embodiment of a fluid line connector assembly in accordance with the present invention installed on a passage through a bulkhead.

Referring now in greater detail to the drawings, wherein the showings are for the purposes of illustrating preferred embodiments of the invention only, and not for the purpose of limiting the invention, FIG. 1 shows a fluid line connector assembly 10 in accordance with the present invention installed on a wall or bulkhead 12. A passage wall 14 is provided on bulkhead 12 that defines a hole or passage 16. Passage 16 has a maximum passage cross-sectional dimension D1, and can optionally include a minimum passage cross-sectional dimension (not shown) that is different than dimension D1.

Fluid line connector assembly 10 is supported on bulkhead 12 within passage 16 by a grommet or sealing member 18, and includes a length of flexible tubing 20 having an end fitting assembly 22 supported thereon. Preferably, flexible tubing 20 is a thin-walled, flexible, metal tubing having a plurality of corrugations 24 extending therealong. It will be appreciated that corrugations 24 are shown in FIG. 1 as being helical corrugations. However, corrugations of any suitable size, shape or form can be used. Additionally, tubing 20 is shown in FIG. 1 as having a bend therein of about 90 degrees. This bend is shown purely for illustrative purposes, and it will be appreciated that the tubing can take any suitable shape, form or configuration. Furthermore, tubing 20 is shown in FIG. 1 as having a maximum tubing cross-sectional dimension D2 that is less than dimension D1 of passage 16.

End fitting assembly 22 includes an end fitting 26 supported on a generally cylindrical, non-corrugated tubing end 28. It will be appreciated that the end fitting can be supported on the tubing end in any suitable manner, such as by brazing, welding, crimping or by using a compression fit, for example. An end fitting accessory 30 is supported on end fitting 26 and has a maximum accessory cross-sectional dimension D3. It should also be appreciated that both end fitting 26 and end fitting accessory 30 can be of any shape, form and/or configuration, and can be attached, connected or otherwise supported on one another in any suitable manner. It should be further appreciated that end fitting accessory 30 is optional, and that dimension D3 could be attributed to end fitting 26 rather than accessory 30 without departing from the scope and intent of the present invention.

The length of flexible tubing has an intermediate, non-corrugated section 32 extending therealong between tubing end 28 and an opposing tubing end 34. As such, a portion of the plurality of corrugations extends between intermediate section 32 and each of tubing ends 28 and 34. The intermediate section has a maximum section cross-sectional dimension D4 that is less than dimension D2 of the tubing. Additionally, a second end fitting FTG can be supoorted on tubing end 34. The second end fitting is shown as having a maximum second fitting dimension DFT that is less than passage dimension D1.

Sealing member 18 has an inside wall 36 cooperable with intermediate section 32 for forming a substantially fluid-tight seal therebetween. Sealing member 18 is preferably a split sealing member. As such, the sealing member can be spread apart along the split (not shown) such that inside wall 36 can abuttingly engage intermediate section 32. Sealing member 18 includes an annular groove 38 opening radially outwardly along outside wall 40 that is suitable for interengaging and forming a substantially fluid-tight seal with bulkhead 12. Preferably, sealing member 18 has a slightly larger dimension across annular groove 38 than dimension D1 of opening 16. As such, as sealing member 18 is installed on bulkhead 12 in opening 16, inside wall 36 of the sealing member is compressed against intermediate section 32 of flexible tubing 20 forming a substantially fluid-tight seal therebetween. Additionally, this same compression causes the split (not shown) in sealing member 18 to be forced together such that a substantially fluid-tight seal is also formed therealong.

Dimension D1 of opening 16 in bulkhead 12 is preferably slightly larger than dimension D3 of end fitting accessory 30 such that the end fitting accessory can be fit through opening 16 in bulkhead 12. Preferably, the same dimensional arrangement is used where the end fitting accessory is not provided and only an end fitting is used. One advantage of such an arrangement is that the end fitting assembly can be attached to the length of tubing prior to assembly on the bulkhead. This can result in reduced assembly time and costs. Once the length of tubing and end fitting assembly have been extended through opening 16 on bulkhead 12, sealing member 18 can be installed on intermediate section 32 that has been provided on tubing 20. Thereafter, sealing member 18 is forced into position on opening 16 of bulkhead 12 in a conventional manner, thus forming a substantially fluid-tight seal between opposing sides of the bulkhead. As such, with the fluid line connector assembly and sealing member installed on the bulkhead, fluid is substantially unable to pass between the opposing sides of the bulkhead, except through the length of tubing.

Figure 2:
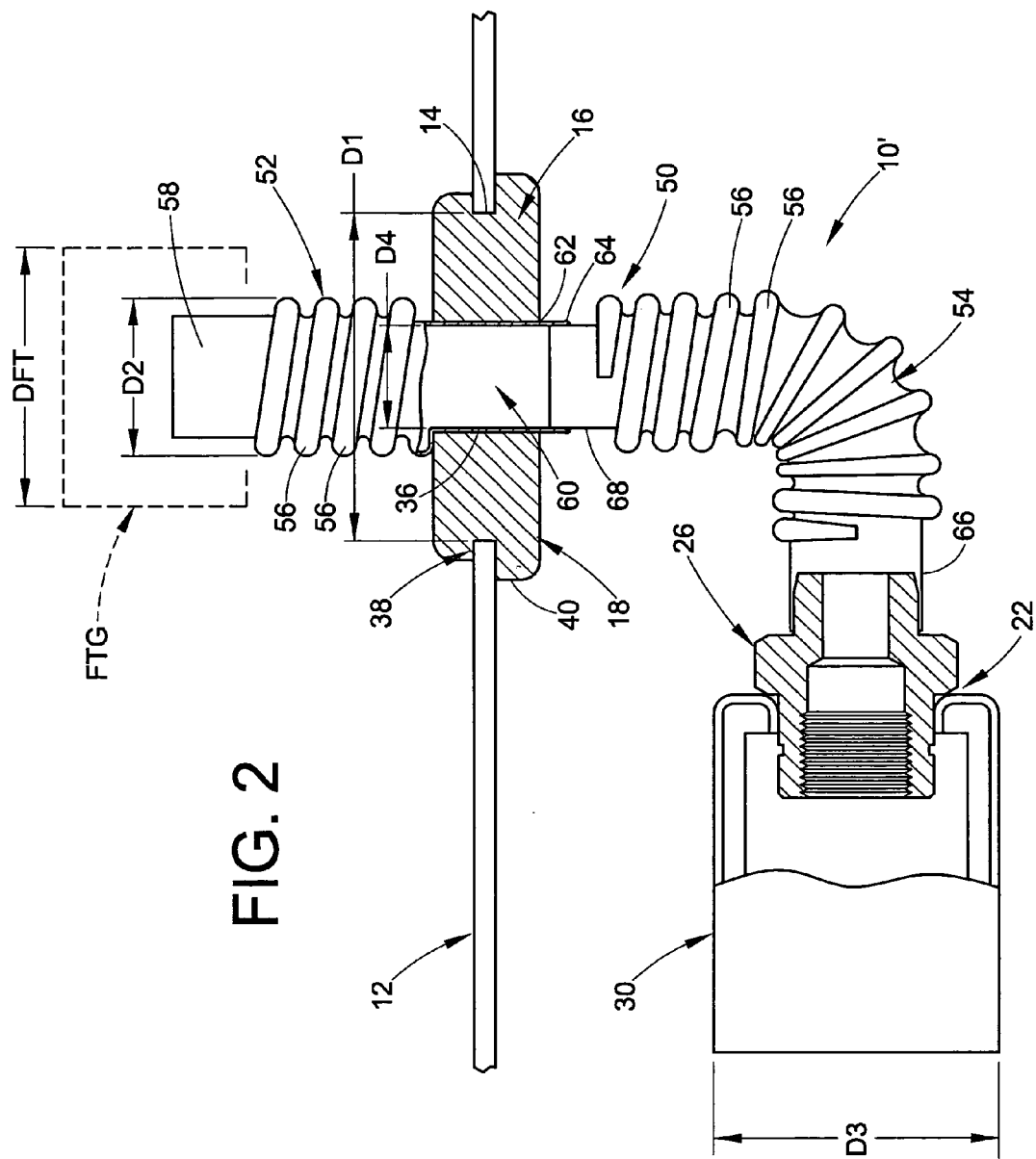
FIG. 2 is a top plan view of another embodiment of a fluid line connector assembly in accordance with the present invention installed on a passage through a bulkhead.

FIG. 2 illustrates another embodiment of a fluid line connector assembly 10' in accordance with the present invention. It will be appreciated that assembly 10' is substantially similar to assembly 10 shown in and described with regard to FIG. 1. Since the embodiments shown in FIGS. 1 and 2 are otherwise substantially similar, the features and components in FIG. 1 will have the same item numbers in FIG. 2. Features and/or components shown in one drawing figure, but having no counterpart in the other drawing figure, will be distinctly pointed out and discussed where appropriate.

Fluid line connector assembly 10' includes a tubing assembly 50 rather than flexible tubing 20 shown and described with regard to FIG. 1. Tubing assembly 50 includes a first length of tubing 52 and a second length of tubing 54. The lengths of tubing are preferably thin-walled, flexible metal tubing having a plurality of corrugations 56 extending along at least a portion of each length. It will be appreciated that corrugations 56 are shown in FIG. 2 as being helical corrugations. However, corrugations of any suitable size, shape or form can be used. Additionally, lengths of tubing 52 and 54 are shown in FIG. 2 as having a bend therein of about 90 degrees. This bend is shown purely for illustrative purposes, and it will be appreciated that the tubing can take any suitable shape, form or configuration.

First length of tubing 52 has opposing non-corrugated tubing ends 58 and 60. Tubing end 58 can take any suitable shape, form or configuration for forming a connection with another component or fitting (not shown). Tubing end 60 preferably includes a generally cylindrical portion 62 and an optional flared portion 64. Second length of tubing 54 also includes opposing non-corrugated tubing ends 66 and 68. Tubing end 66 can take any suitable shape, form or configuration for forming a connection with another component or fitting, such as end fitting 26 of end fitting assembly 22. Tubing end 68 is shown in FIG. 2 as being generally cylindrical and received in cylindrical portion 62 of tubing end 60. Preferably, tubing end 68 forms a limited clearance sliding fit into cylindrical portion 62 that is suitable for forming a fluid-tight joint therebetween. The joint between ends 60 and 68 effectively forms a length of tubing having a non-corrugated intermediate section in accordance with the present invention.

One suitable method of joining the ends is brazing. However, it will be appreciated that any suitable method or combination of methods can be used, such as soldering, welding and/or crimping, for example. Additionally, it will be further appreciated that flared portion 64 is optionally provided at least in part to facilitate assembly of tubing end 68 into cylindrical portion 62. As such, any other suitable feature and/or geometry can be optionally or additionally provided.

Tubing ends 28 and 34 along with intermediate section 32 shown in FIG. 1 and tubing ends 58, 60, 66 and 68 shown in FIG. 2 can be formed in any suitable manner, such as by crimping, swaging, intermittent corrugation or any other manner of de-corrugating known by those skilled in the art. Furthermore, additional secondary processes can optionally be employed to further provide a smooth end having the desired shape, form, size and/or finish. Such secondary processes can include grinding, burnishing or any suitable forming operation to provide the desired smooth surface. In one embodiment, the intermediate portion is substantially cylindrical and has an RMS finish of 60 micro inches or less depending on the sealing member to be used in association with the intermediate portion.

While the invention has been described with reference to the preferred embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of this disclosure.

The invention claimed is:

1. A fluid line connector assembly comprising:
   a wall section including a passage formed therethrough;
   a length of tubing extending between opposing tubing ends, said length of tubing including a first corrugated portion, a second corrugated portion spaced from said first corrugated portion, and a non-corrugated section disposed between said first and second corrugated portions, said length of tubing supported on said wall section such that at least a portion of said non-corrugated section is disposed within said passage; and,
   a sealing member disposed between said non-corrugated section and said wall section and forming a substantially fluid-tight seal therebetween.

2. A fluid line connector assembly according to claim 1, wherein said sealing member includes an outer wall and a radially-outwardly opening groove formed along said outer wall, said groove receiving at least a portion of said wall section and forming a substantially fluid-tight seal therewith.

3. A fluid line connector assembly according to claim 1, wherein said non-corrugated section of said length of tubing is approximately cylindrical, and said sealing member includes an approximately cylindrical inner wall in abutting engagement with said non-corrugated section and forming a substantially fluid-tight seal therewith.

4. A fluid line connector assembly according to claim 1, wherein said non-corrugated section is integrally formed along said length of tubing.

5. A fluid line connector assembly according to claim 1, wherein said length of tubing includes a longitudinal axis, a maximum cross-sectional first dimension disposed substantially transverse to said longitudinal axis along one of said first and second corrugated portions, and a maximum cross-sectional second dimension disposed substantially transverse to said longitudinal axis along said non-corrugated section, said second dimension being less than said first dimension.

6. A fluid line connector assembly according to claim 1, wherein a first tubing end of said opposing tubing ends includes an approximately cylindrical non-corrugated portion.

7. A fluid line connector assembly according to claim 6 further comprising an end fitting supported on said first tubing end.

8. An assembly comprising a fluid line connector installed on a wall having a passage extending therethrough, said assembly comprising:
   a length of tubing having a plurality of corrugations formed therealong between opposing tubing ends and a non-corrugated section disposed such that a portion of said plurality of corrugations extends between said non-corrugated section and each of said tubing ends; and,
   a sealing member supported along said non-corrugated section;
   said length of tubing being positioned adjacent the wall such that said non-corrugated section is received along the passage, and said sealing member extending between said non-corrugated section and the wall forming a substantially fluid-tight seal therebetween.

9. An assembly according to claim 8, wherein said non-corrugated section is integrally formed on said length of tubing.

10. An assembly according to claim 8, wherein said length of tubing is formed from first and second tubing portions each having a portion of said plurality of corrugations extending between opposing ends.

11. An assembly according to claim 10, wherein a first end of said first tubing portion is non-corrugated and a first end of said second tubing portion is received on said first end of said first tubing portion such that said first end of said first tubing portion at least partially forms said non-corrugated section.

12. An assembly according to claim 11, wherein said first end of said second tubing portion is non-corrugated and is dimensioned to be received within said first end of said first tubing portion.

13. An assembly according to claim 8 further comprising an end fitting supported on one of said opposing tubing ends.

14. An assembly according to claim 13, wherein said one of said opposing tubing ends has a non-corrugated portion and said end fitting is received on said non-corrugated portion.

15. Ab assembly according to claim 14, wherein said non-corrugated portion of said tubing end is generally cylindrical.

16. An assembly according to claim 8, wherein said sealing member is an elastomeric grommet having a radially outwardly extending split.

17. An assembly comprising fluid line connector received on a wall having a passage extending therethrough, the passage having an associated passage axis and an associated cross-sectional passage dimension extending substantially transverse to the passage axis, said fluid line connector assembly comprising:
   a length of tubing having a plurality of corrugations formed therealong between opposing tubing ends and a non-corrugated section disposed such that a portion of said plurality of corrugations extends between said non-corrugated section and each of said tubing ends, said length of tubing having a longitudinal tubing axis, a maximum cross-sectional first tubing dimension extending substantially transverse to said tubing axis across said plurality of corrugations and a maximum cross-sectional second tubing dimension extending substantially transverse to said tubing axis across said non-corrugated section, said first tubing dimension being greater than said second tubing dimension and less than the passage dimension, said length of tubing being received on the wall such that said non-corrugated section is positioned along the passage; and
   a sealing member supported on said length of tubing and extending between said non-corrugated section and the wall to form a substantially fluid-tight seal therebetween.

18. An assembly according to claim 17, wherein said non-corrugated section is integrally formed on said length of tubing.

19. An assembly according to claim 17 further comprising a first end fitting supported on a first tubing end of said opposing tubing ends, said first end fitting having a maximum cross-sectional first fitting dimension extending substantially transverse to said tubing axis, said first fitting dimension being less than the passage dimension.

20. An assembly according to claim 19 further comprising a second end fitting supported on a second tubing end of said opposing tubing ends, said second end fitting having a maximum cross-sectional second fitting dimension extending substantially transverse to said tubing axis, said second fitting dimension being less than the passage dimension.

\* \* \* \* \*

UNITED STATES PATENT AND TRADEMARK OFFICE
CERTIFICATE OF CORRECTION

| | |
|---|---|
| PATENT NO. | : 7,198,304 B2 |
| APPLICATION NO. | : 10/854419 |
| DATED | : April 3, 2007 |
| INVENTOR(S) | : Michael T. Angus |

It is certified that error appears in the above-identified patent and that said Letters Patent is hereby corrected as shown below:

Column 7, lines 47-49, delete claim 15 and insert the following:

15. An assembly according to claim 14, wherein said non-corrugated portion of said tubing end is generally cylindrical.

Column 8, lines 4-9, delete the first paragraph of claim 17 and insert the following:

An assembly comprising a fluid line connector received on a wall having a passage extending therethrough, the passage having a passage axis and a cross-sectional passage dimension extending substantially transverse to the passage axis, said fluid line connector assembly comprising:

Signed and Sealed this

Twelfth Day of June, 2007

JON W. DUDAS
*Director of the United States Patent and Trademark Office*